(12) United States Patent
Basso

(10) Patent No.: US 6,800,961 B2
(45) Date of Patent: Oct. 5, 2004

(54) APPARATUS AND METHOD FOR CONTROLLING A POWER SUPPLY

(75) Inventor: Christophe Basso, Pibrac (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 555 days.

(21) Appl. No.: 09/785,084

(22) Filed: Feb. 20, 2001

(65) Prior Publication Data

US 2004/0070277 A1 Apr. 15, 2004

(30) Foreign Application Priority Data

Nov. 23, 2000 (EP) .......................... 00403280

(51) Int. Cl.[7] ............................... H02J 3/14
(52) U.S. Cl. ................................... 307/43
(58) Field of Search ........................ 307/43, 44, 130; 323/234; 348/730

(56) References Cited

U.S. PATENT DOCUMENTS

| | | | |
|---|---|---|---|
| 4,024,577 A | * 5/1977 | Diethelm ................... 348/730 |
| 4,439,819 A | * 3/1984 | Regan ......................... 363/17 |
| 4,500,923 A | * 2/1985 | Duvall et al. ............... 348/730 |
| 4,532,457 A | * 7/1985 | Haferl ......................... 348/730 |
| 4,651,214 A | * 3/1987 | Rodriguez-Cavazos ..... 348/730 |
| 4,688,159 A | 8/1987 | Marinus |
| 4,716,463 A | * 12/1987 | Stacy et al. ................. 348/730 |
| 4,734,771 A | 3/1988 | Lendaro et al. |
| 4,751,580 A | * 6/1988 | Fitzgerald et al. .......... 348/730 |
| 4,766,528 A | 8/1988 | Marinus |
| 4,975,592 A | * 12/1990 | Hahn et al. ................. 348/730 |
| 5,029,269 A | * 7/1991 | Elliott et al. ............... 363/21.1 |
| 5,036,261 A | * 7/1991 | Testin ......................... 315/411 |
| 5,083,254 A | 1/1992 | Feldtkeller |
| 5,270,823 A | * 12/1993 | Heidebroek et al. ........ 348/730 |
| 5,429,442 A | * 7/1995 | Schrader ................. 400/157.3 |
| 5,617,048 A | 4/1997 | Ward et al. |
| 5,642,004 A | 6/1997 | Bircher |
| 5,698,908 A | * 12/1997 | Pollmeier et al. ............. 307/43 |
| 5,703,764 A | 12/1997 | Hermann et al. |
| 5,739,705 A | 4/1998 | John |
| 5,747,977 A | 5/1998 | Hwang |
| 5,796,596 A | * 8/1998 | Williams .................. 363/21.16 |
| 5,812,017 A | * 9/1998 | Golla et al. .................. 327/536 |
| 5,825,165 A | 10/1998 | Kitching et al. |
| 5,914,865 A | 6/1999 | Barbehenn et al. |
| 5,920,466 A | * 7/1999 | Hirahara ................... 363/21.02 |
| 5,926,010 A | * 7/1999 | Hosokawa et al. ........ 323/222 |
| 5,946,180 A | 8/1999 | Simpson ...................... 361/93 |
| 5,949,154 A | * 9/1999 | Williams .................... 348/730 |
| 5,955,871 A | 9/1999 | Nguyen |
| 5,956,240 A | * 9/1999 | Williams ...................... 363/49 |
| 5,995,384 A | * 11/1999 | Majid et al. .............. 363/21.18 |
| 6,049,143 A | * 4/2000 | Simpson et al. ............ 307/131 |
| 6,067,506 A | * 5/2000 | Goldys et al. .............. 702/117 |
| 6,088,244 A | * 7/2000 | Shioya et al. ............. 363/21.07 |

(List continued on next page.)

FOREIGN PATENT DOCUMENTS

| | | | | |
|---|---|---|---|---|
| DE | 4244530 | * | 7/1994 | .......... H02M/3/335 |
| EP | 0749199 | | 12/1996 | |
| JP | 2000308343 | * | 11/2000 | .......... H02M/3/028 |

OTHER PUBLICATIONS

Philips Semiconductors, Integrated Circuits Data Sheet, TEA 1501, Greeny; GreenChip, Aug. 19, 1998.

*Primary Examiner*—Gregory J. Toatley, Jr.

(57) ABSTRACT

In a dual power supply, a main power supply is shut down by providing a signal from an auxiliary power supply. To generate the shutdown signal, a load is temporarily applied to the output of the auxiliary power supply for a predetermined time. The application of the load is detected using a hysteretic comparator in the auxiliary power supply that remains in a high state for a time period that exceeds a reference time period, which is established by a timer circuit. In response to exceeding the reference time period, the shutdown signal is sent to the main power supply.

25 Claims, 7 Drawing Sheets

U.S. PATENT DOCUMENTS

| | | | |
|---|---|---|---|
| 6,166,926 A * | 12/2000 | Nath et al. | 363/21.03 |
| 6,188,587 B1 * | 2/2001 | Yun et al. | 363/49 |
| 6,295,217 B1 * | 9/2001 | Yang et al. | 363/49 |
| 6,330,175 B2 * | 12/2001 | Shirato et al. | 363/89 |
| 6,333,862 B1 * | 12/2001 | Lee et al. | 363/21.01 |
| 6,385,060 B1 * | 5/2002 | Basso et al. | 363/21.15 |
| 6,385,061 B1 * | 5/2002 | Turchi et al. | 363/21.15 |
| 6,456,153 B2 * | 9/2002 | Buck et al. | 327/536 |
| 6,462,437 B1 * | 10/2002 | Marmaropoulos et al. | 348/730 |
| 6,469,484 B2 * | 10/2002 | L'Hermite et al. | 323/284 |
| 6,496,390 B2 * | 12/2002 | Yang | 363/21.07 |
| 6,538,419 B1 * | 3/2003 | Allen et al. | 323/285 |
| 6,559,627 B2 * | 5/2003 | Khouri et al. | 323/282 |

\* cited by examiner

APPARATUS AND METHOD FOR CONTROLLING A POWER SUPPLY

FIELD OF THE INVENTION

The present invention relates in general to a power supply and more particularly to an apparatus and method for controlling a power supply by applying a temporary load to the power supply in order to generate a control signal.

BACKGROUND OF THE INVENTION

Dual switched-mode power supplies are commonly used for electronic devices such as televisions that generally operate at two power levels, a high power level during normal operation and a low power level during standby operation. For example, for a television the high power level corresponds to providing power to the picture tube, receiver, speaker, and control circuitry, and the low power level corresponds to supplying power only to the control circuitry so that the television remains in a standby mode. A large, main switched-mode power supply is used to provide power to the picture tube, receiver, and speaker, and a small, auxiliary switched-mode power supply is used to supply power to the control circuitry.

The control circuitry for the television generally comprises a microprocessor to control the various functions of the television, memory to store operating information like the last volume level and last channel watched by the user, and a detector to receive signals from a remote control unit. The use of the dual power supply conserves energy when the television is in the standby mode.

To operate the television, the user generally presses a button on the remote control, which transmits a signal to the detector in the television. The detector transmits the signal to the microprocessor, which decodes the signal and performs the requested function, for example, turning on or off the television.

When the user has requested that the television turn off, the microprocessor turns off the main power supply, leaving the auxiliary power supply on. In prior televisions, because the control circuitry is located on the isolated side of the auxiliary power supply, complex circuitry such as a mechanical relay or a combination of signals on a secondary-side optocoupler, which provides a normal feedback plus a forced standby signal in response to the user requesting the shutdown of the television, is used to communicate the shutdown command from the control circuitry to the main power supply. It would be desirable to communicate this command using simplified circuitry. Accordingly, there is a need for an improved way in a dual power supply configuration to communicate a shutdown command to the main power supply from control circuitry powered by the auxiliary power supply.

DETAIL DESCRIPTION OF THE DRAWINGS

Figure 1:
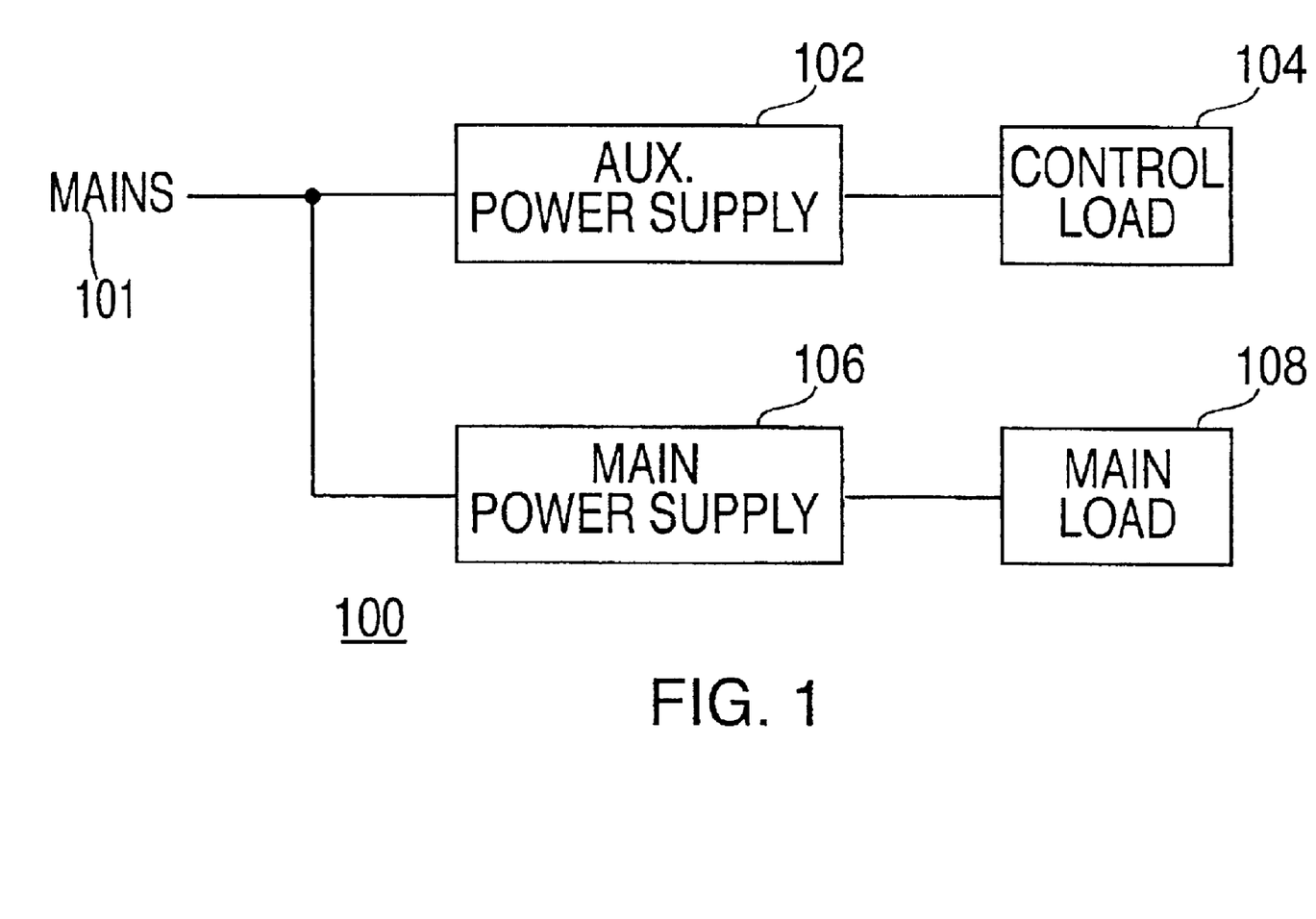
FIG. 1 is a schematic diagram of a dual power supply, having an auxiliary power supply powering a control load, according to an embodiment of the present invention.

The present invention generally provides an apparatus and method for controlling a power supply. FIG. 1 is a schematic diagram of a dual power supply 100 comprising an auxiliary power supply 102 that provides power to a control load 104. A main power supply 106 provides power to a main load 108. A MAINS input terminal 101 provides, for example, AC power to auxiliary power supply 102 and main power supply 106. Main load 108 and control load 104 correspond, for example, to the power loads of a television or other electronic device. Main load 108 includes, for example, a picture tube, and control load 104 includes, for example, control circuitry for the television such as a microprocessor and memory. As discussed further below, the microprocessor is used to communicate operating information, for example commands from a user to turn on or off the electronic device, to the auxiliary power supply.

Figure 2:
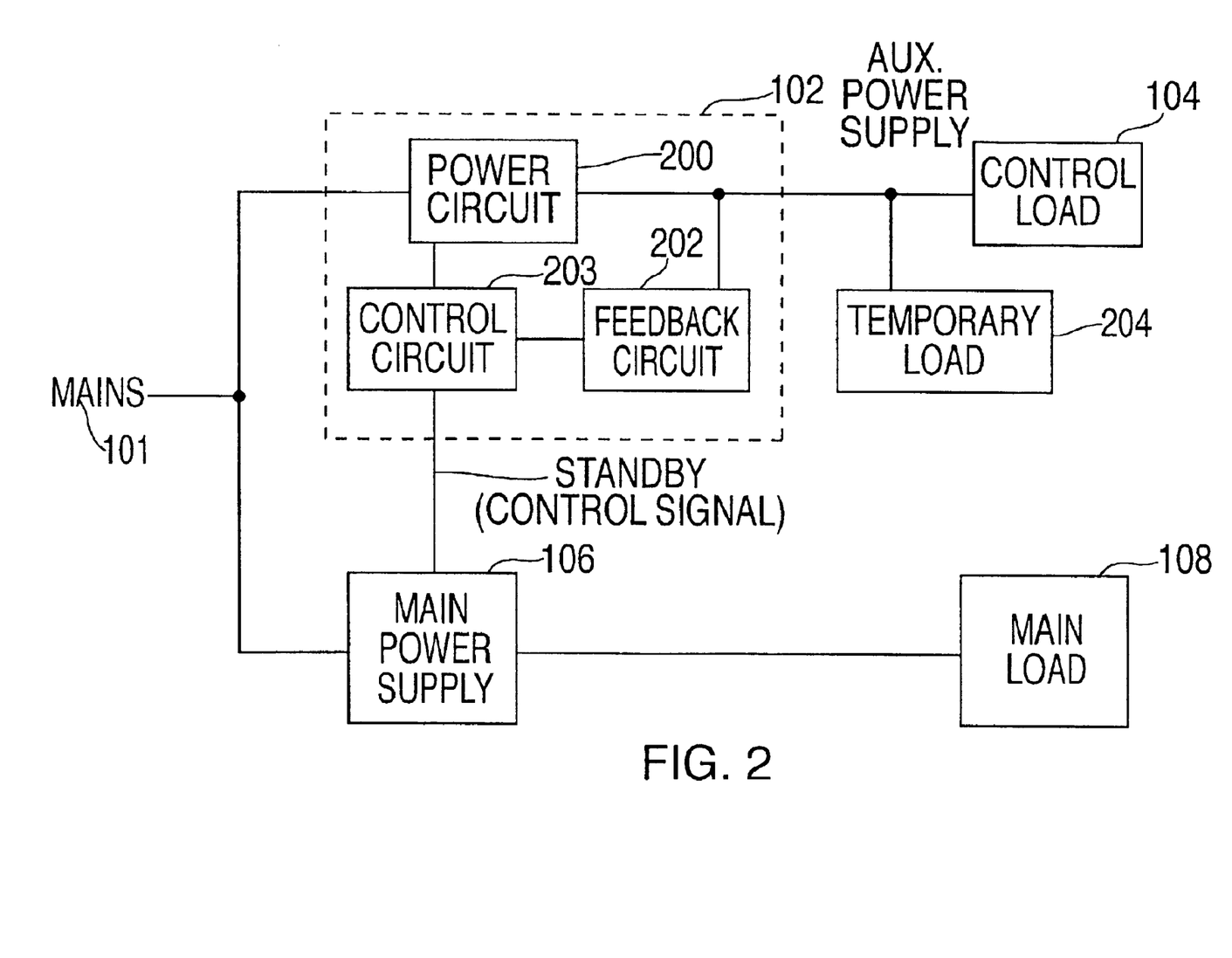
FIG. 2 is a schematic diagram illustrating the application of a temporary load to the auxiliary power supply of FIG. 1 according to an embodiment of the present invention.

FIG. 2 is a schematic diagram illustrating the application of a temporary load 204 to auxiliary power supply 102 of FIG. 1 according to an embodiment of the present invention. Auxiliary power supply comprises a power circuit 200, a feedback circuit 202, and a control circuit 203. Auxiliary power supply 102 is, for example, a switched-mode power supply.

Temporary load 204 is, for example, a resistive load coupled to temporarily overload auxiliary power supply 102. In response to the application of temporary load 204, control circuit 203 provides a control signal STANDBY to main power supply 106. The STANDBY signal generally alternates between two states, an on state and an off state, used to control main power supply 106 on and off.

Figure 3:
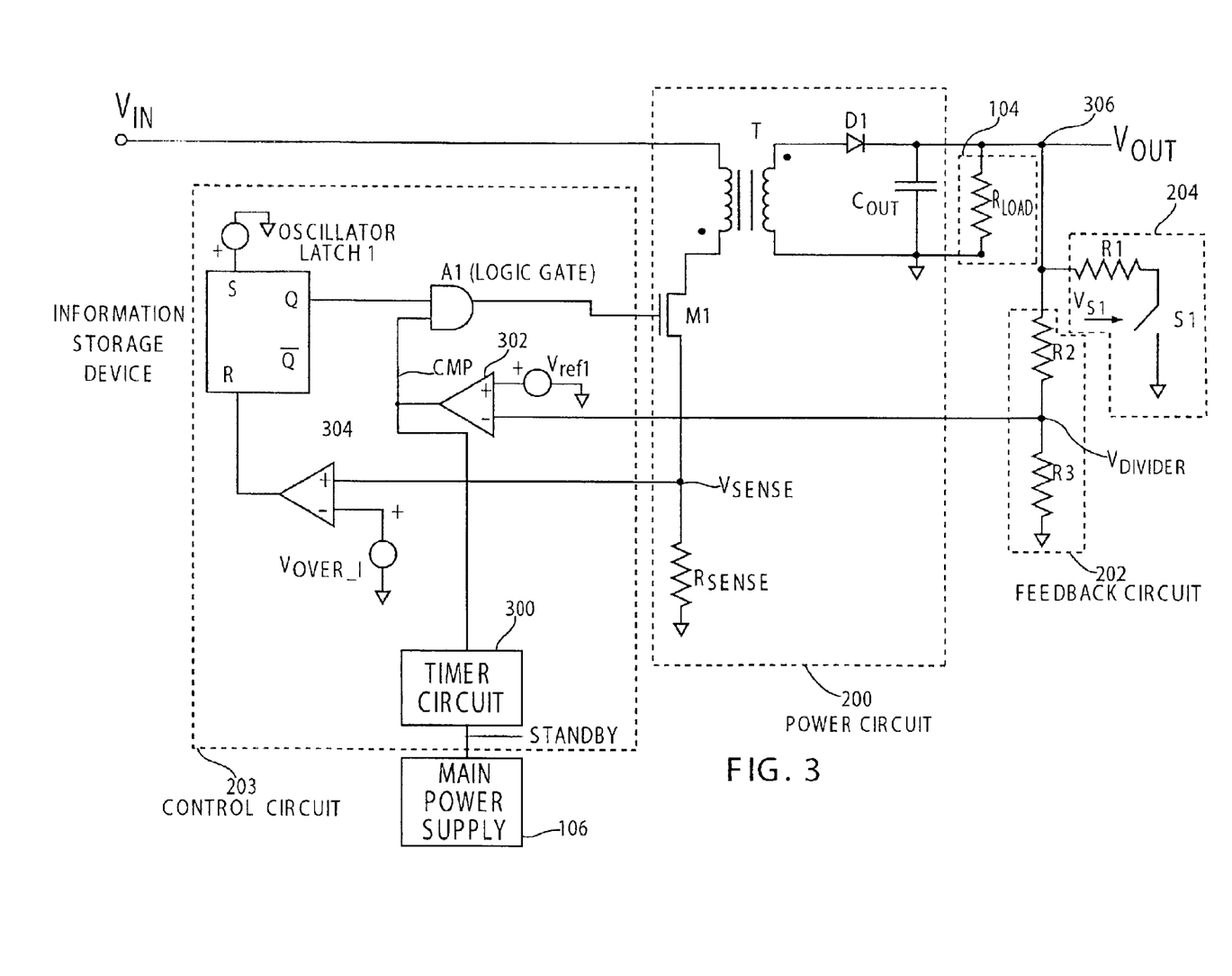
FIG. 3 is a more detailed schematic diagram of the auxiliary power supply of FIG. 2.

FIG. 3 is a more detailed schematic diagram of power circuit 200, feedback circuit 202, and control circuit 203 and the external circuit connections of auxiliary power supply 102. Power circuit 200 receives a voltage $V_{in}$ from MAINS input terminal 101 that is coupled to the primary side of transformer T. A switching power transistor M1 is coupled to control primary current through transformer T. Transistor M1 is, for example, an N-type MOSFET. A resistor $R_{sense}$ is coupled in series with transistor M1 to provide a voltage $V_{sense}$ to control circuit 203 that is indicative of the primary current flow through transformer T.

The secondary side of transformer T is coupled to a diode D1 and output supply capacitor $C_{out}$ to provide a rectified voltage $V_{out}$ at output node 306 to control load 104, which is represented generally by resistive load $R_{load}$. Temporary load 204 is coupled to output node 306 and comprises, for example, a resistor R1 coupled in series with a switch S1. A switching voltage input $V_{S1}$ controls switch S1 and is provided, for example, by a microprocessor (not shown) in the control circuitry of control load 104. Switch S1 may be, for example, a relay, a MOSFET, or a bipolar transistor. In addition to the above approach, other ways of temporarily overloading auxiliary power supply include the unbalancing of feedback circuit 202 by using a switch in feedback circuit 202 (for example, implemented in silicon or by mechanical means) so that auxiliary power supply 102 responds as if in an overloaded condition.

Feedback circuit 202 has an input coupled to node 306 and comprises, for example, a voltage divider provided by resistors R2 and R3 connected in series. The output voltage $V_{divider}$ from the voltage divider is provided as a feedback signal to control circuit 203.

Control circuit 203 comprises a comparator 302 having an inverting input for receiving the feedback signal from feedback circuit 202. Comparator 302 is a hysteretic comparator. A non-inverting input of comparator 302 is coupled to a voltage reference $V_{ref1}$. Comparator 302 provides an output signal CMP that controls the charging and discharging cycle of power circuit 200. During normal operation, CMP generally alternates between two states, an on state authorizing the primary power cycling and an off state preventing the cycling of power circuit 200. When CMP is in an on state (i.e. a logic high state), transistor M1 may be turned on at a rate dictated by the oscillator. When CMP is in an off state (i.e. a logic low state), transistor M1 cannot be activated at all.

A logical AND gate A1 has an input to receive signal CMP and an input to receive a data output signal Q from a latch LATCH1, such as for example an S-R type latch configured as illustrated. The output of gate A1 is coupled to a control terminal of transistor M1 to control current flow through the primary side of power circuit 200.

A comparator 304 has a non-inverting input coupled to receive voltage $V_{sense}$ and an inverting input coupled to a voltage source $V_{over\_I}$. The output of comparator 304 is coupled to the reset input of LATCH1. An oscillator signal is coupled to the set input of LATCH1.

Figure 5:
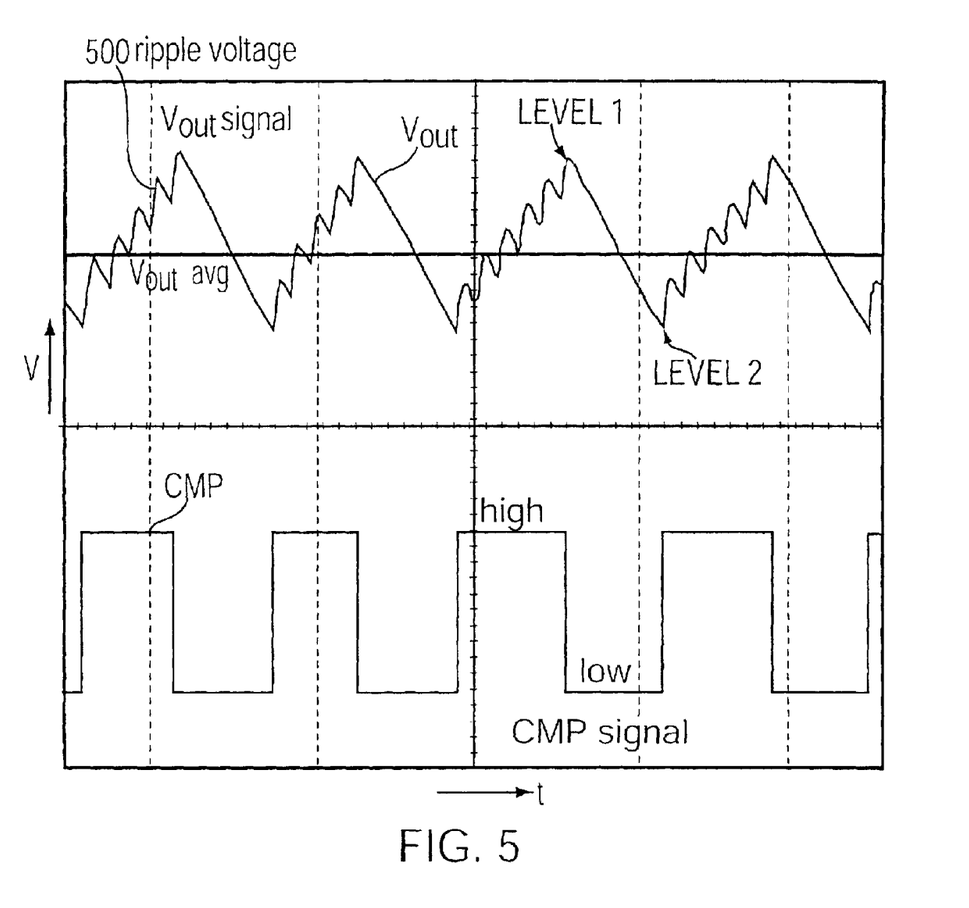
FIG. 5 is a voltage waveform illustrating normal operation of the dual power supply of FIG. 2.

During operation, when signal CMP is in a high state, each time the OSCILLATOR signal activates LATCH1 and the Q output goes high, transistor M1 turns on and current builds up in the primary inductance of transformer T. D1 does not yet conduct current because of the dot windings configuration of transformer T as shown in FIG. 3. Comparator 304 monitors the current build-up and resets LATCH1 so that transistor M1 turns off. Specifically, voltage $V_{sense}$ increases until it exceeds $V_{over\_I}$, at which point the output of comparator 304 goes high and resets LATCH1. In response to transistor M1 turning off, the voltage of the transformer T primary inductance reverses and energy transfer now takes place in the secondary transformer inductance. Voltage $V_{out}$ increases by one step due to current conduction through D1. A new switching cycle occurs, and $V_{out}$ rises by additional steps for as long as CMP remains in an on state. Referring to FIG. 5, which is discussed in more detail below, when $V_{out}$ has reached the upper voltage threshold LEVEL1 indicated in FIG. 5, CMP goes low, turns off transistor M1, and $V_{out}$ slowly decreases with a slope determined by $C_{out}$ and $R_{load}$. When $V_{out}$ has reached the lower voltage threshold LEVEL2, CMP goes high again and a new cycle occurs.

Timer Circuit

A timer circuit 300 receives signal CMP and provides control signal STANDBY to main power supply 106. When temporary load 204 is applied to output node 306 by switch S1 such that the auxiliary supply is overloaded, signal CMP goes to a high state for as long as temporary load 204 is applied. Because of the length of time that temporary load 204 is applied, signal CMP remains in this high state for a period of time that is greater than the time period during normal operation prior to applying temporary load 204. Timer circuit 300 monitors the time period that CMP is in a high state and triggers a change in the state of the STANDBY signal in response to this time period exceeding a reference time period determined by timer circuit 300, as discussed further below. If the time period does not exceed the reference time period, then the signal STANDBY remains unchanged. The comparison to the reference time period protects against providing an incorrect STANDBY signal, for example caused by spurious voltage variations in auxiliary power supply 102.

Figure 4:
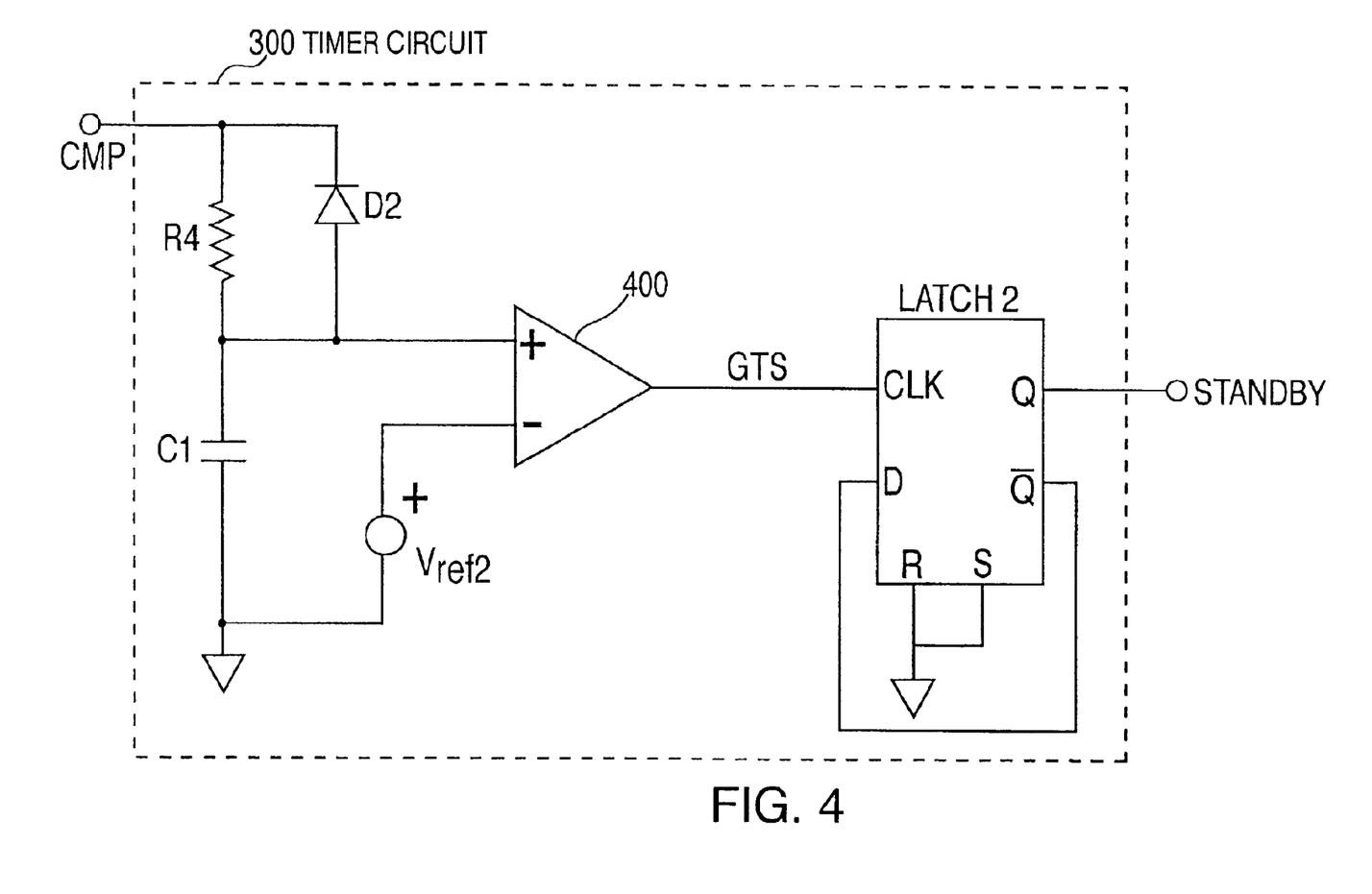
FIG. 4 is a schematic diagram of a timer circuit for the auxiliary power supply of FIG. 3.

FIG. 4 is a schematic diagram of timer circuit 300 according to one specific approach. A comparator 400 has a non-inverting input coupled to resistor R4, capacitor C1, and diode D2, and an inverting input coupled to a voltage reference source $V_{ref2}$. R4 and C1 provide an RC time constant used to establish the reference time period mentioned above. The output of comparator 400 provides a signal GTS and is coupled to a latch LATCH2, which may be for example a D-type latch configured as shown. However, other types of latches and timers may be used in other embodiments. LATCH2 has a clock input for receiving the output of comparator 400 and a data output Q for providing the signal STANDBY. The inverse data output $Q_{bar}$ of LATCH2 is coupled to the data input D, and the set and reset inputs are tied to ground.

Waveform

FIG. 5 is a voltage waveform illustrating normal operation of dual power supply 100. Specifically, voltage $V_{out}$ is illustrated versus time and varies between voltages LEVEL1 and LEVEL2. The average voltage $V_{out\_avg}$ of $V_{out}$ is also shown. Signal CMP is also shown. When CMP is in an on or high state, $V_{out}$ is increasing with a ripple voltage 500 due to the switched-mode characteristics of auxiliary power supply 102. When CMP is in an off state, $V_{out}$ is decreasing since transistor M1 is turned off and control load 104 discharges supply output node 306.

Signal CMP is a feedback signal responsive to the power being delivered to control load 104. As the load varies, the time period of the on and off states of CMP varies to keep $V_{out\_avg}$ substantially constant. More specifically, and referring again to FIG. 3, CMP varies in response to the voltage $V_{out}$. When $V_{out}$ is at LEVEL2, voltage $V_{divider}$ is at a low level less than voltage $V_{ref1}$. Thus, CMP goes to a high level or on state, which enables transistor M1 to turn on to permit charging by power circuit 200 and to provide an increasing voltage $V_{out}$.

$V_{out}$ continues to increase until reaching LEVEL1, at which point $V_{divider}$ is at a high level greater than $V_{ref1}$. Thus, CMP goes to a low level or off state. It should be noted that due to the nature of hysteretic comparator 302, $V_{ref1}$ will have a value that is different depending on whether $V_{divider}$ is rising or falling. This hysteresis simply provides two different levels (LEVEL1 and LEVEL2 as indicated in FIG. 5) necessary to the power supply operating mode (this type of supply is sometimes also referred to as a ripple-mode switched-mode power supply). The cycle repeats itself once $V_{out}$ again reaches LEVEL2. $V_{ref1}$ is set to an appropriate value between LEVEL1 and LEVEL2 using standard techniques appropriate for this type of power supply.

Controlling the Main Power Supply

When a user of an electronic appliance, such as for example a television, decides to turn it off (or alternatively, when another electronic system or circuit sends a shutdown signal to dual power supply 100), the user activates a remote control to send (or the other system or circuit sends) a signal, which is decoded by a microprocessor in the control circuitry for the television. The microprocessor asserts $V_{S1}$ to turn on switch S1 to connect temporary load 204 to the output of power circuit 200 for a time period programmed into the microprocessor or otherwise predetermined and fixed. After this predetermined time period has passed, then $V_{S1}$ is no longer asserted, and switch S1 is opened.

In response to the application of the temporary load for this predetermined time period, voltage $V_{out}$ decreases and lowers $V_{divider}$ below $V_{ref1}$ so that CMP goes to an on state. If CMP remains at this on state for a sufficient time, then timer circuit 300 asserts STANDBY to turn off main power supply 106.

More specifically, each time that signal CMP goes to a high level, timer circuit 300 monitors the time that CMP remains at the high level. This monitoring is continuously done both during normal operation and otherwise. Referring again to FIG. 4, when CMP is high, C1 is charged through R4. If CMP is high for a time period sufficient for C1 to charge to a voltage greater than $V_{ref2}$, then GTS goes high. However, during normal operation, CMP goes low during each charging cycle before C1 is sufficiently charged to trigger a change in GTS, and accordingly, GTS remains at a low state or off state corresponding, for example, to normal operation of a television. When CMP returns to a low level, C1 is discharged through diode D2 in preparation for the next time that CMP again goes high.

LATCH2 provides control signal STANDBY and toggles STANDBY between an on state (corresponding to a standby or shutdown mode) and an off state (corresponding to normal operation) each time that GTS goes to an ON state. Thus, when CMP is at a high state for a time period greater than the reference time period established by R4 and C1 and the comparison voltage value provided by $V_{ref2}$, then GTS goes high, which latches STANDBY to a high state and turns off main power supply 106.

To turn, for example, the television on again, the user again activates the remote control, which in turn is decoded by the microprocessor in the control circuitry to again assert $V_{S1}$ and apply the temporary load to the output of power circuit 200 for another predetermined time, for example the same time period used to initiate shut-down. As described above, $V_{out}$ again falls and $V_{divider}$ falls below $V_{ref1}$, so that CMP goes high. Timer circuit 300 again monitors the time that CMP is in this high state, and comparator 400 asserts GTS to latch STANDBY to an off state so that the main power supply 106 turns on again.

Figure 6:
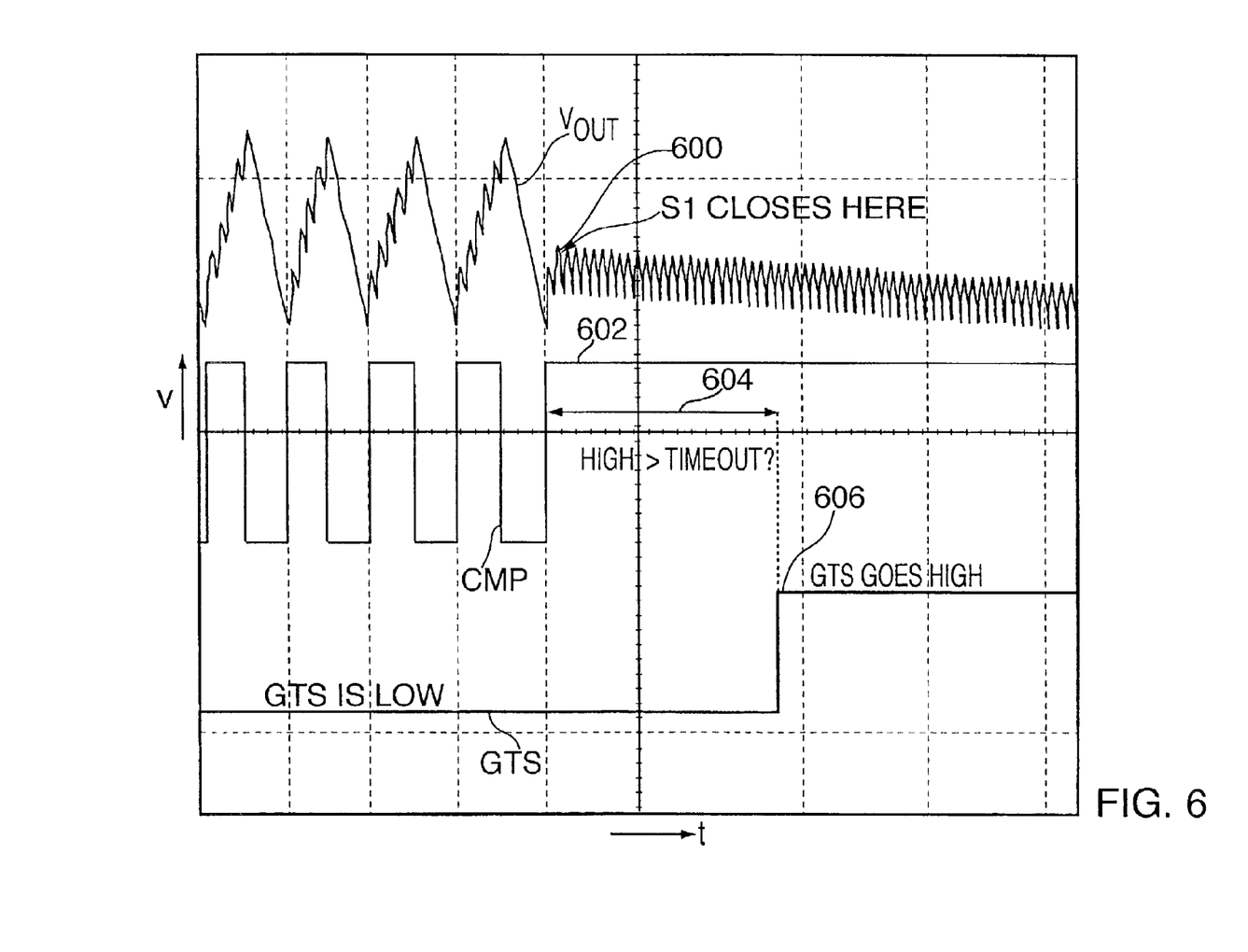
FIGS. 6 and 7 are voltage waveforms illustrating operation of the dual power supply of FIG. 2 after application of the temporary load.
Figure 7:
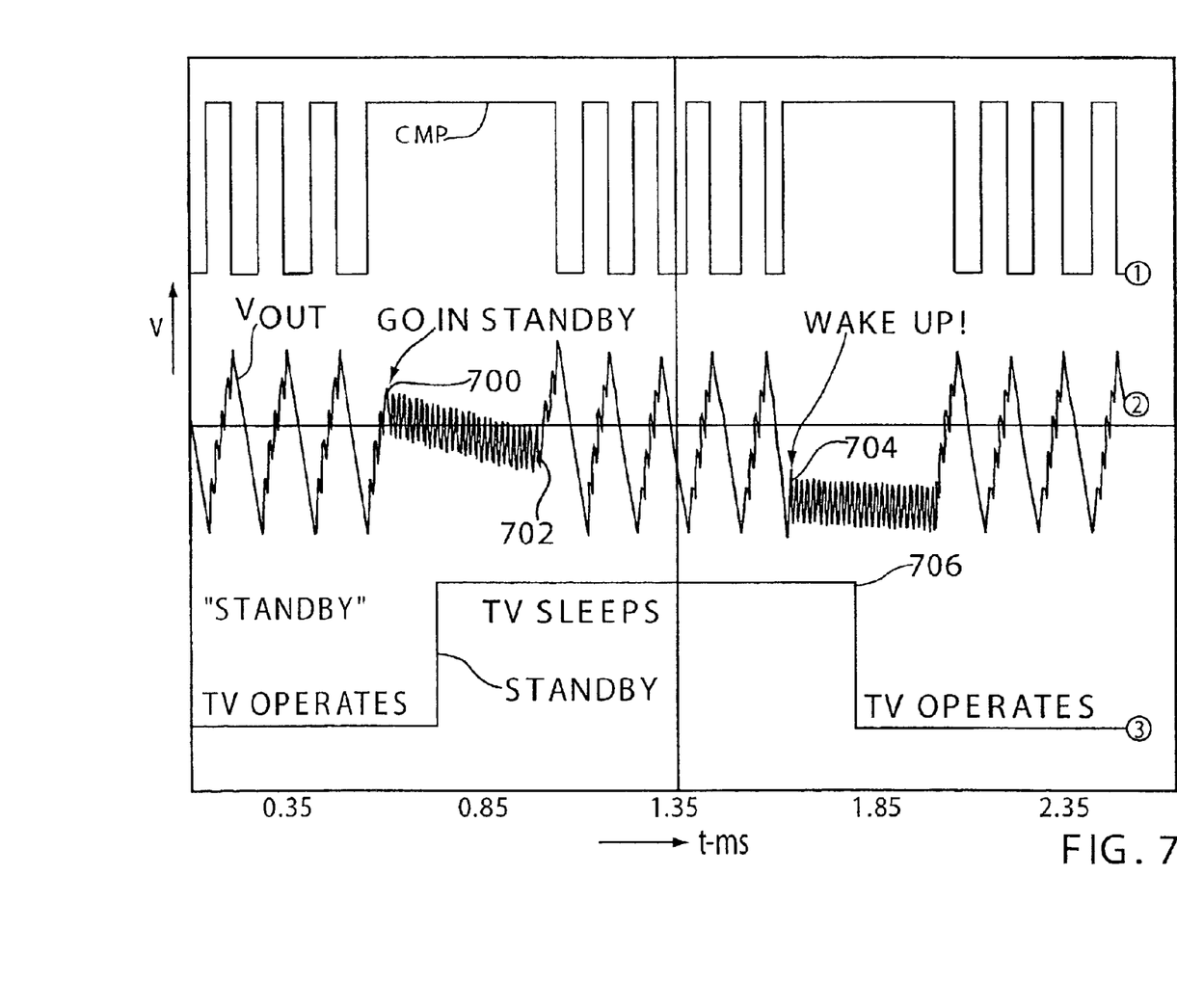

FIGS. 6 and 7 are voltage waveforms illustrating the operation of dual power supply 100 after application of temporary load 204 to auxiliary power supply 102. In FIG. 6, switch S1 is closed at a point indicated by reference numeral 600. CMP was high prior to switch S1 closing and remains in a high state, indicated by reference numeral 602, for a time period 604 sufficient to trigger timer circuit 300. Then, GTS goes high at a point as indicated by reference numeral 606.

In FIG. 7, the user requests the turn-off of, for example, the television at point 700. Switch S1 is closed, and CMP remains at a high state for a sufficient time for STANDBY to be latched to a high or on state, which turns off main power supply 106. At point 702, switch S1 is turned off.

At point 704, the user requests that the television be turned on and switch S1 is again turned on for a predetermined time period. CMP remains high for a sufficient time that STANDBY is latched to a low or off state so that main power supply 106 is turned on.

Advantages

By the foregoing description, a novel and unobvious apparatus and method for controlling a power supply have been disclosed. The present invention has the advantages of providing simplified circuitry for communicating a shutdown command from control circuitry powered by an auxiliary power supply to the main power supply. For example, it is not necessary to use an optocoupler in this communication as with prior dual power supplies. It is also possible to use a fully primary regulated auxiliary power supply where no optocoupler is implemented. In addition, overall standby power is not degraded according to the present invention since switch S1 is relaxed to remove the temporary load and the STANDBY signal is latched to maintain the shutdown state of the main power supply.

Although specific embodiments have been described above, numerous modifications and substitutions may be made thereto without departing from the spirit of the invention. For example, while the description above is discussed specifically in the context of an AC-DC converter, other power supply configurations may be used with the present invention including DC-DC converters. Also, the present invention may also be used with other electronic devices using two or more power supplies. Accordingly, the invention has been described by way of illustration rather than limitation.

What is claimed is:

1. A control circuit for controlling a first power supply, comprising:
   a feedback circuit;
   an input for coupling to a temporary load through the feedback circuit; and
   an output for coupling to the first power supply wherein, in response to the coupling to the temporary load for a predetermined time period, a signal is provided to control the first power supply.

2. The control circuit of claim 1 further comprising a comparator having an output coupled to generate the signal to control the first power supply, wherein:
   a second power supply provides an output supply voltage;
   the output of the comparator varies alternately between an on state corresponding to an increasing output supply voltage and an off state corresponding to a decreasing output supply voltage;
   the on state corresponds to a first time period prior to the coupling to the temporary load;
   in response to the coupling to the temporary load, the output of the comparator goes to the on state for a second time period greater than the first time period; and
   in response to the output of the comparator going to the on state for the second time period, the signal is provided to the first power supply.

3. The control circuit of claim 2 wherein the predetermined time period is greater then the first time period.

4. The control circuit of claim 2 wherein the comparator is a hysteretic comparator.

5. The control circuit of claim 2 further comprising a timer circuit having an input coupled to the output of the comparator and having an output for providing the signal to control the first power supply in response to the second time period exceeding a reference time period.

6. The control circuit of claim 5 wherein the average power output of the second power supply is less than the average power output of the first power supply.

7. The control circuit of claim 5 wherein the signal is used to turn the first power supply on and off.

8. A control circuit for controlling a first power supply, comprising:
   a first control input for receiving a feedback signal;
   a feedback circuit having an output for providing the feedback signal;
   a first comparator for generating, responsive to the feedback signal, a compare signal having a first state and a second state;
   a first control output for providing a control signal to the first power supply, wherein the control signal changes state in response to the compare signal being in the first state for a time period exceeding a reference time period;
   a second control input for coupling to a power circuit to receive a signal indicative of the current supplied to the power circuit, wherein an output of the power circuit is coupled to an input of the feedback circuit;

a second control output for coupling to the power circuit to control the current supplied to the power circuit;

a logic gate having a first input coupled to an output of the first comparator and having an output coupled to the second control output of the control circuit; and a timer circuit having an input coupled to the output of the first comparator and an output coupled to the first control output of the control circuit.

9. The control circuit of claim 8 wherein:

the feedback circuit further comprises a voltage divider; and the power circuit further comprises:
   a transformer having a primary side coupled to the second control input of the control circuit and a secondary side coupled to the output of the power circuit; and
   a transistor having a control electrode coupled to the second control output of the control circuit and having a current electrode coupled to the primary side of the transformer.

10. The control circuit of claim 8 further comprising:

a latch having an output coupled to a second input of the logic gate, a first input coupled to an oscillator, and a second input coupled to the second control input of the control circuit; and a reference voltage coupled to a non-inverting input to the first comparator, wherein an inverting input to the first comparator is coupled to the first control input of the control circuit.

11. The control circuit of claim 8 wherein the timer circuit comprises:

a second comparator;

a latch having an input coupled to an output of the second comparator and having an output for providing the control signal to the first power supply; and a resistor and capacitor coupled to a non-inverting input of the second comparator for providing the reference time period.

12. The control circuit of claim 8 wherein:

the output of the power circuit is coupled continuously to a control load;

the input of the feedback circuit is temporarily coupled to a temporary load for a predetermined time; and the control signal is responsive to the feedback circuit being temporarily coupled to the temporary load.

13. The control circuit of claim 12 wherein the temporary load is coupled to the feedback circuit by activating a switch coupled to the temporary load, wherein the switch comprises a control input for receiving a switching signal from control circuitry in the control load.

14. The control circuit of claim 13 wherein the control circuitry in the control load comprises a microprocessor having an output coupled to provide the switching signal.

15. The control circuit of claim 8 wherein the control signal is provided to a second power supply for switching the first power supply on and off.

16. A dual power supply, comprising:

a first power supply comprising a control circuit and a power circuit, wherein the power circuit has an output for coupling to a temporary load;

a second power supply coupled to an output of the control circuit; and wherein the control circuit generates a signal to control the second power supply in response to the coupling to the temporary load for a time period that exceeds a reference time period.

17. The dual power supply of claim 16 wherein the control circuit comprises:

a hysteretic comparator having an input coupled to the output of the power circuit; and a timer circuit having an input coupled to an output of the hysteretic comparator, wherein an output of the timer circuit provides the signal to control the second power supply.

18. A method of operating a dual power supply, wherein the dual power supply comprises a first power supply and a second power supply, comprising:

coupling a temporary load to an output of the first power supply; and responsive to the coupling of the temporary load for a predetermined time, providing a signal to the second power supply for switching the second power supply on and off.

19. The method of claim 18 wherein providing the signal to the second power supply comprises:

detecting the coupling of the temporary load by monitoring a time period that an output from a comparator is in a first state, wherein the comparator has an input coupled to the output of the first power supply and wherein the output of the comparator alternates between a first state and a second state; and providing the signal to the second power supply when the time period exceeds a reference time period.

20. The method of claim 19 wherein:

prior to coupling the temporary load, the voltage of the output of the first power supply rises and falls between a first level and a second level;

prior to coupling the temporary load, the first state of the output of the comparator corresponds to an increasing voltage at the output of the first power supply and the second state of the output of the comparator corresponds to a decreasing voltage at the output of the first power supply; and after coupling the temporary load, the first state of the output of the comparator corresponds to a decreasing voltage at the output of the first power supply.

21. The method of claim 20 wherein the signal to the second power supply is alternately latched between an on state and an off state; wherein the on state corresponds to turning on the second power supply and the off state corresponds to turning off the second power supply.

22. A method of operating a first power supply, comprising:

applying a temporary load to a second power supply to provide a signal for controlling the first power supply, wherein the second power supply comprises a comparator and further comprising providing the signal to the first power supply responsive to an output of the comparator remaining in an on state longer than a reference time period.

23. The method of claim 22 wherein the comparator is a hysteretic comparator.

24. The method of claim 22 comprising applying the temporary load for a predetermined time period.

25. The method of claim 22 wherein the signal is provided to shut down the first power supply.

* * * * *